US010762446B2

(12) United States Patent
Ravindra (10) Patent No.: US 10,762,446 B2
(45) Date of Patent: Sep. 1, 2020

(54) ACCESS CONTROL FOR A DIGITAL EVENT (71) Applicant: eBay Inc., San Jose, CA (US)

(72) Inventor: Shreyas Ravindra, San Jose, CA (US)

(73) Assignee: eBay Inc., San Jose, CA (US)

(*) Notice: Subject to any disclaimer, the term of this patent is extended or adjusted under 35 U.S.C. 154(b) by 745 days.

(21) Appl. No.: 15/226,679

(22) Filed: Aug. 2, 2016

(65) Prior Publication Data
US 2018/0039916 A1 Feb. 8, 2018

(51) Int. Cl.
G06Q 10/02 (2012.01)
G06Q 20/04 (2012.01)
G06Q 20/12 (2012.01)
G06Q 20/40 (2012.01)
H04L 29/06 (2006.01)
H04W 12/06 (2009.01)

(52) U.S. Cl.
CPC .......... *G06Q 10/02* (2013.01); *H04L 63/083* (2013.01); *H04L 63/104* (2013.01); *H04L 65/60* (2013.01); *H04W 12/06* (2013.01); *H04L 63/101* (2013.01)

(58) Field of Classification Search
CPC .... H04N 21/2387; G06Q 10/02; G06Q 20/40; G06Q 20/0457; G06Q 20/12; H04L 63/104; H04L 63/083; H04L 63/101; H04W 12/06; G07B 15/00
See application file for complete search history.

(56) References Cited

U.S. PATENT DOCUMENTS 6,112,181 A 8/2000 Shear et al.
6,124,862 A 9/2000 Boyken et al.
7,995,756 B1 8/2011 Mckinney et al.
(Continued)

FOREIGN PATENT DOCUMENTS

JP 2002-073874 A 3/2002
JP 2011-160029 A 8/2011
WO 2018/026647 A1 2/2018

OTHER PUBLICATIONS

Spotify, Other Devices Interrupting my sessions, Apr. 12, 2015 and Jul. 12, 2015, Spotify Community, https://community.spotify.com/t5/Other-Partners-Web-Player-etc/Other-devices-interrupti ng-my-sessions/td-p/1110699 (Year: 2015).*
Spotify, Multiple Devices. Premium upgrade, Apr. 4, 2016, Spotify Community https://community.spotify.com/t5/Accounts/Multiple-devices-Premium-upgrade/td-p/1320402 (Year: 2016).*
Spotify, You are listening on, Feb. 28, 2016, Spotify Community, https://connnnunity.spotify.conn/t5/Accounts/You-are-listening-on/td-p/1298814 (Year: 2016).*

(Continued)

*Primary Examiner* — Kevin H Flynn
*Assistant Examiner* — Ismail A Manejwala
(74) *Attorney, Agent, or Firm* — Shook, Hardy & Bacon LLP (57) ABSTRACT A method for access control to a digital event is disclosed. The method may include receiving, from a first client device, a request to purchase an electronic ticket for a digital event. The method may further include sending an event identifier to the first client device. The method may also include receiving an access request to access the digital event, wherein the access request includes the event identifier and a password. The method may include identifying a second client device that is currently accessing the digital event. The method may further include sending a message to the second client device indicative of the access request received from the first client device. The method may include receiving authorization from the second client device to initiate a transfer of access to the digital event from the second client device to the first client device.

20 Claims, 5 Drawing Sheets

(56) References Cited

U.S. PATENT DOCUMENTS

| | | | |
|---|---|---|---|
| 8,319,845 B2 | 11/2012 | Ortiz | |
| 9,323,916 B1* | 4/2016 | Wu | G06F 21/44 |
| 2002/0059425 A1 | 5/2002 | Belfiore et al. | |
| 2007/0260604 A1 | 11/2007 | Haeuser et al. | |
| 2009/0087167 A1* | 4/2009 | Seisun | H04N 5/76 |
| | | | 386/296 |
| 2011/0107436 A1* | 5/2011 | Cholas | H04N 21/2541 |
| | | | 726/29 |
| 2012/0084803 A1 | 4/2012 | Johansson et al. | |
| 2012/0173356 A1* | 7/2012 | Fan | G06Q 10/101 |
| | | | 705/26.1 |
| 2012/0210378 A1* | 8/2012 | McCoy | H04N 21/422 |
| | | | 725/109 |
| 2012/0224024 A1* | 9/2012 | Lueth | H04L 65/605 |
| | | | 348/43 |
| 2012/0303491 A1 | 11/2012 | Hill et al. | |
| 2013/0042271 A1* | 2/2013 | Yellin | H04N 5/765 |
| | | | 725/41 |
| 2013/0160146 A1 | 6/2013 | Kaiser et al. | |
| 2014/0040364 A1 | 2/2014 | Baldwin et al. | |
| 2016/0105428 A1 | 4/2016 | Schrempp et al. | |
| 2016/0149841 A1 | 5/2016 | Lewis et al. | |
| 2017/0228550 A1* | 8/2017 | Harb | H04N 21/436 |
| 2017/0346821 A1* | 11/2017 | Yedidi | H04L 63/0884 |

OTHER PUBLICATIONS

Brandenbeurg et al., "Immersive Second-Screen Experiences Using Hybrid Media Synchronization", "Retrieved from the Internet: <URL:http://publications.tno.nllpublication/106435/IP15J2/brandenburg-2013-immersive.pdf>.", Oct. 29, 2013, 7 pgs.

International Search Report received for PCT Application No. PCT/US2017/044352, dated Nov. 16, 2017, 4 pgs.

Written Opinion received for PCT Application No. PCT/US2017/044352, dated Nov. 16, 2017, 10 pgs.

International Preliminary Report on Patentability received for PCT Application No. PCT/US2017/044352, dated Feb. 5, 2019, 11 pages.

Extended European search report Received for European Patent Application No. 17837438.5, dated Mar. 6, 2020, 9 pages.

Office Action received for Korean Patent Application No. 10-2019-7003482 dated Jul. 6, 2020, 13 pages (7 pages of Official Copy and 6 pages of English Translation).

* cited by examiner

ACCESS CONTROL FOR A DIGITAL EVENT

FIELD

The embodiments discussed in the present disclosure are related to access control for a digital event.

BACKGROUND

Ticket marketplace websites provide users the ability to purchase tickets for events. The tickets are used to reserve seats and/or admission for events, such as sporting events, concerts, theater events, and other entertainment events. On some of the websites, a user searches for available tickets and decides which, if any, of the available tickets are of interest to the user and have the best value. To allow a user to make an informed decision on which tickets to obtain, the ticket marketplace website may provide information about venues in which the events are taking place.

The subject matter claimed in the present disclosure is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure may relate to providing access control for a digital event via an online ticket marketplace. Under conventional systems, an electronic ticket to a digital event may be sold and distributed as a Uniform Resource Identifier (e.g., a Uniform Resource Locater (URL)), but the URL may be used by many devices, thereby circumventing any intent for the electronic ticket to be limited to a single user.

Aspects of the present disclosure address these and other deficiencies of conventional systems by providing access control for a digital event via an online ticket marketplace. When an electronic ticket is sold for a digital event, a server may associate an event identifier with a password that may later be used to access the digital event. A client device may attempt to access the digital event using the event identifier and the password. When another client device is already accessing the digital event, a determination may be made to ascertain which device is authorized to access the digital event. In some instances, a handoff may be initiated to stop one device from accessing the digital event while permitting another client device to access the digital event.

In at least one embodiment, a server-based method may include receiving, from a first client device, a request to purchase an electronic ticket for a digital event. The method may further include sending an event identifier to the first client device. The method may also include receiving an access request to access the digital event, wherein the access request includes the event identifier and a password. The method may include identifying a second client device that is currently accessing the digital event. The method may further include sending a message to the second client device indicative of the access request received from the first client device. The method may include receiving authorization from the second client device to initiate a transfer of access to the digital event from the second client device to the first client device.

Figure 1:
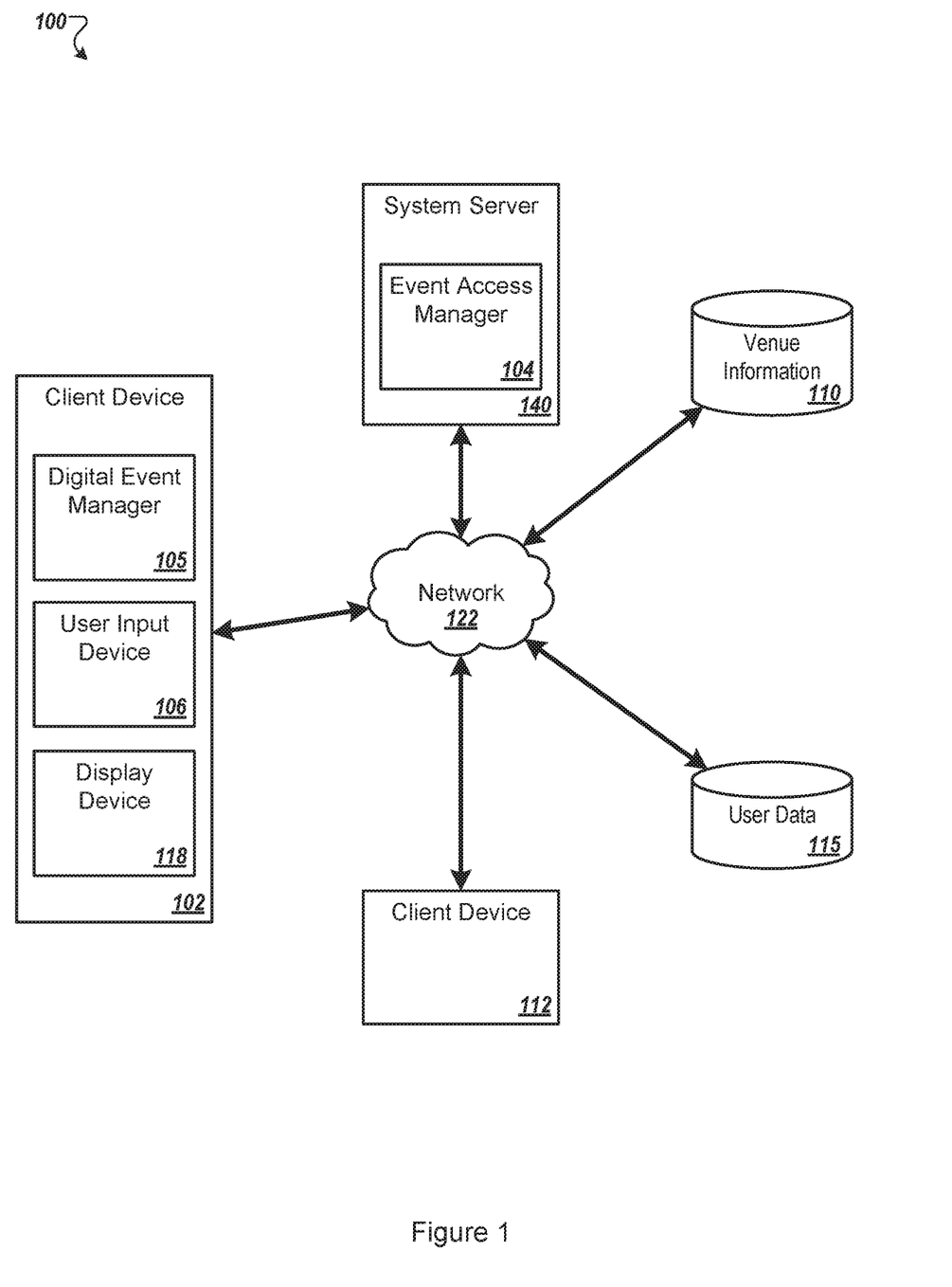
FIG. 1 illustrates an example operating environment in which an online ticket marketplace may be implemented.

FIG. 1 illustrates an example operating environment 100 in which an online ticket marketplace (hereinafter, "marketplace") may be implemented. In the operating environment 100, a user may interact with their client device 102 to search for and/or obtain electronic tickets, which may be listed on a site that is hosted or controlled by a system server 140. The electronic tickets may be for a digital event that occurs at a venue. The venue may include any forum in which events may take place or are performed. The venue may include a physical venue (e.g., a stadium, an arena, a theatre, a parking lot, a fairground) or a digital venue (e.g., video game). The digital event may include a digital representation of any type of happening in which tickets are used for entry. Some examples of the digital event are sporting events, concerts, plays, movies, festivals, video games matches or competitions, and the like. The digital event may include a live or previously recorded video of a tangible or intangible event. A tangible event may refer to a physical event that may occur in the real world, such as a sports event, a concert, and the like. For a tangible event, a camera may be positioned to record the tangible event. The recording of the tangible event may be streamed live, streamed with a delay, and/or made available for later viewing. In at least one embodiment, the recording of the tangible event may be recorded and provided as a virtual reality event, which may provide a simulation of what it may be like to attend the tangible event in person. An intangible event may refer to an event taking place in a virtual world, such as in a video game, a software-based environment, and the like. As will be described, the system server 140 may provide access control to any type of digital event.

The operating environment 100 of FIG. 1 may include the system server 140, the client device 102, the network 122, and one or more data storages 110, 115. The system server 140, the client device 102, and the data storages 110, 115 (collectively, environment components) may communicate information and data via the network 122. For example, one or more of the environment components may communicate information and data related to ticket transactions such as the previews, user input, and event information. Each of the environment components is briefly described in the following paragraphs.

The network 122 may include a wired network, a wireless network, or any combination thereof. The network 122 may include any suitable configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The user may include an individual or an entity that may interface with the client device 102 to participate in a ticketing search, a ticketing transaction, or accessing a digital event. For example, the user may include a person who wants to purchase an electronic ticket to access a particular digital event. The user may be associated with the client device 102.

The client device 102 may include a computing device that may include a processor, memory, and network communication capabilities. The client device 102 may be configured for communication with one or more other environment components via the network 122. Some examples of the client device 102 include a laptop computer, a desktop computer, a tablet computer, a mobile telephone, a smartphone, a personal digital assistant ("PDA"), a mobile e-mail device, a portable game player, a portable music player, smart wearable technology, a virtual reality device, an augmented reality device, or any other applicable electronic device capable of directly or indirectly accessing the network 122.

The client device 102 may include a user input device 106, a display device 118, and a digital event manager 105. The user input device 106 may include one or more pieces of hardware configured to notify the user of the client device 102 of a communication, and/or present a communication to the user. In these and other embodiments, the user input device 106 may also be configured to receive input from the user of the client device 102. In some embodiments, the user input device 106 may include one or more of: a speaker, a microphone, a display device (e.g., the display device 118), a joystick, a direction pad (D-pad), a trigger input, a motion sensor, eye tracker, a trackpad, a thermal input capturing device, a keyboard, and a touch screen, among other hardware devices.

The display device 118 may include a surface on which information and data are displayed to the user. The surface may be substantially planar or curved. In addition, in some embodiments, at least a portion of the user input may be received by the display device 118. Some examples of the display device 118 may include a light emitting diode (LED) display, liquid crystal displays (LCD) thin film transistor (TFT) LCD, in-place switching (IPS) LCD, resistive touch-screen LCD, capacitive touchscreen LCD, organic LED (OLED), active-matrix OLED, etc. In at least one embodiment, the display device 118 is configured to present virtual reality or augmented reality data including the digital event.

The digital event manager 105 may be configured to manage the viewing of a digital event. In at least one embodiment, the digital event manager 105 may implement a marketplace interaction with the system server 140 that facilitates a purchase of an electronic ticket that may be used to access the digital event. The digital event manager 105 may also include an access control component for the digital event. For example, a user may purchase an electronic ticket to a sporting event and the digital event manager 105 may implement access control for the sporting event to limit others from accessing the sporting event using the electronic ticket purchased by the user. In at least one embodiment, devices authorized by the user may be permitted to access the sporting event while access may be limited or restricted for devices not authorized by the user.

The digital event manager 105 may be implemented using hardware including a processor, a microprocessor (e.g., to perform or control performance of one or more operations), a field-programmable gate array (FPGA), or an application-specific integrated circuit (ASIC). In some other instances, the digital event manager 105 may be implemented using a combination of hardware and software. Implementation in software may include rapid activation and deactivation of one or more transistors or transistor elements such as may be included in hardware of a computing system (e.g., the client device 102). Additionally, software defined instructions may operate on information within transistor elements. Implementation of software instructions may at least temporarily reconfigure electronic pathways and transform computing hardware.

The system server 140 may include a hardware server that includes a processor, memory, and network communication capabilities. In the illustrated implementation, the system server 140 is configured to communicate via the network 122 with the other environment components. The system server 140 may include an event access manager 104.

The event access manager 104 may generate an electronic ticket for a digital event and may limit or restrict access to the digital event. The event access manager 104 may use an event identifier, a password and/or a device identifier (e.g., UUID) to limit or restrict access to the digital event, as further described below. The event access manager 104 may be implemented using hardware including a processor, a microprocessor (e.g., to perform or control performance of one or more operations), an FPGA, or an ASIC. In some other instances, the event access manager 104 may be implemented using a combination of hardware and software. Implementation in software may include rapid activation and deactivation of one or more transistors or transistor elements such as may be included in hardware of a computing system (e.g., the system server 140). Additionally, software defined instructions may operate on information within transistor elements. Implementation of software instructions may at least temporarily reconfigure electronic pathways and transform computing hardware.

The operating environment 100 may also include a venue information database 110 and a user data database 115. The databases 110, 115 may include a memory (e.g., random access memory), a cache, a drive (e.g., a hard drive), a flash drive, a database system, or another type of component or device capable of storing data. The databases 110, 115 may also include multiple storage components (e.g., multiple drives or multiple databases) that may also span multiple computing devices (e.g., multiple server computers).

The venue information database 110 may store venue information pertaining to one or more particular event occurring at the venue. For example, the event information includes one or more ticket prices for one or more seating sections or from one or more seats of the venue, ticket availability for one or more seating sections or for one or more of the seats of the venue, weather data for one or more seats or seating sections of the venue at any given time, and the like.

The venue information 110 may also include two-dimensional or three-dimensional digital images, digital videos, the previews, and digital maps of the venue. The digital images may be non-interactive or fixed views from one or more of the seats and/or views from one or more of the seating sections of the venue. The digital images may include portions of a computer-aided design (CAD) model of the venue and/or actual photographic images of the venue.

The previews may include portions of the CAD model and/or actual photographic images or videos of the venue. In embodiments in which the previews includes photographic images or videos of the venue, the client device 102 may be used as a view finder through which the venue is viewed. Photographic images or videos displayed on the client device 102 may be enhanced by overlaying information over the photographic images or videos. The information overlaid on the photographic image or video may include informational overlays (e.g., seat prices, weather data, seat availability, advertisements).

The user data database 115 may store information pertaining to the user, such as a user profile, purchase history, payment methods and accounts, event identifiers for purchased electronic tickets, passwords, user device information, etc.

In operation, the digital event manager 105 may present digital event information pertaining to the digital event on the display device 118 of the client device 102. The digital event information may include a name of the event, anticipated content of the digital event, a price for an electronic ticket for the digital event, and the like. The digital event information may also include a digital map (as described below), which may include a representation of a venue. For example, the digital map may depict seating sections and/or seats of the venue as arranged for a particular event.

The digital event manager 105 may receive user input via the user input device 106 used to purchase an electronic ticket for the digital event. For digital events with more than one available view point, the digital event manager 105 may receive user input via the user input device 106 used to select a seat or location in the venue.

As a user contemplates a ticket purchase, the user may request a preview of the event, which may be provided to the client device 102 from a system server 140 or from the venue information database 110 via a network 122. The preview may depict a seat view from a particular location (e.g., a seating section, a particular seat) in the venue. The preview may include a digital image or video that includes a digital representation of what may be viewed while sitting in the seating section or seat. The image may include a 360-degree image or video, which may be navigable by the user via the client device 102. As used in this disclosure, the term "360-degree image" includes image data from vertical viewing angles and horizontal viewing angles greater than about 300 degrees for a particular point. In at least one embodiment, the digital event may be ongoing and the preview may be a limited live stream of the ongoing digital event. The live stream may be limited, for example, by time (e.g., a fixed duration preview), or content (e.g., a portion of the digital event is obstructed from view), etc.

In at least one embodiment, the preview may include a previously recorded event of the same type. For example, when the digital event is a baseball game, the preview may include footage recorded during a previous baseball game from the same or similar seating section or seat. Further, the preview may be tailored to digital event, such as by accounting for similar conditions of the digital event and of previously recorded events. For example, the digital event may be a baseball game in the evening and the preview may likewise be footage recorded during a previous baseball game in the evening. Still further, the preview may account for changes in conditions during the digital event. For example, the event may be a baseball game that begins in the afternoon and ends in the evening. More than one preview may be used in this example—a first preview depicting the previous baseball game in the afternoon and a second preview depicting the previous baseball game in the evening.

The digital event manager 105 may receive or access, from the system server 140 or from the venue information database 110, a digital preview of a view from the selected seating section or the selected seat. The digital preview may be a weather enhanced graphical preview that includes weather data. In at least one embodiment, the digital event manager 105 may receive the weather data from the system server 140. The weather data may be included with the digital image or video. In at least one embodiment, the digital event manager 105 may receive the weather data from a weather data server and the digital event manager 105 may combine the weather data with the digital image. In at least one embodiment, the digital event manager 105 may receive instructions from the system server 140 pertaining to how to combine the weather data with the digital image to create the preview. In at least one embodiment, the digital event manager 105 may send a request for the instructions to the system server 140. The previews may include different views from a seat or seating section at different times. For example, the previews may depict the sun in a different position in each view.

In at least one embodiment, the client device 102 may include a view control (e.g., a slider bar) to toggle between previews. In at least one embodiment, thumbnails of different selectable previews may be presented via the client device. The user may select a thumbnail to cause the underlying previews to become presented in the display device 118. The digital event manager 105 may display an informational overlay of at least a portion of event information, or information pertaining to the particular view (e.g., time information), or some combination thereof on the display device 118.

Once the user has identified a desirable digital event, the user may provide input via the user input device 106 to purchase an electronic ticket for the digital event. The client device 102 may in turn send a request to the system server 140 to initiate a purchase of the electronic ticket. In response to receiving the request from the client device 102, the system server 140 may associate an event identifier with the electronic ticket. The event identifier may include a unique string that may be associated with this single purchase of the user. In at least one embodiment, the event identifier may include a uniform resource locator (URL). The system server 140 may associate a password with the event identifier. The password may be generated by the system server 140 or may be requested from the user at the client device 102. The password may be a user-selected or user-defined password. The event identifier and password may be stored in association with the user (e.g., in association with a user account of the user) in the user data database 115.

When the user wishes to use the electronic ticket to attend or access the digital event, the user may enter the event identifier via the user input device 106. For example, the user input device 106 may include a browser and the user may enter the event identifier in an address bar of the browser. The user input device 106 may also include a stand-alone application configured to receive event identifiers and to provide access upon successful validation. The client device 102 may send the event identifier received via the user input device 106 to the system server 140. In at least one embodiment, the client device 102 may request a password for the digital event from the user. The client device 102 may receive the password via the user input device 106 and may send the received password to the system server 140 along with the event identifier. In at least one embodiment, the client device 102 may encrypt one or both of the event identifier and password.

The event access manager 104 of the system server 140 may receive the event identifier and may determine whether to permit to the client device 102 to access the digital event. In embodiments where the event access manager 104 does not receive a password with the event identifier, the event access manager 104 may request a password from the client device 102. The event access manager 104 may check the received event identifier and password against data in the user data database 115. When the received event identifier and password match data in the user data database 115 (e.g., received event identifier and password correspond to a matching event identifier and password pair), the event access manager 104 may validate the password. Upon successful validation of the password, the event access manager 104 may grant access to the digital event for the client device 102. The digital event manager 105 may cause the digital event to be presented on the display device 118 of the client device 102.

In at least one embodiment, prior to granting access to the client device 102, the event access manager 104 may further determine whether a second device (e.g., client device 112) is currently accessing the digital event. The client device 112 may include the same or similar features as the client device 102. In an example, the client device 112 may currently be streaming the digital event. Identifying the client device 112 that is currently accessing the digital event may include identifying an active connection to a digital media file associated with the digital event. When a second device (the client device 112) is currently accessing the digital event, the event access manager 104 may determine whether to continue to stream the digital event to the client device 112 or whether to handoff the streaming to the client device 102, as further described with respect to FIGS. 3 and 4.

In at least one embodiment, multiple electronic tickets may be concurrently sold to one or more users. For example, a group of users may desire to purchase seats to virtually attend the same sporting event (before, during or after the event). The multiple electronic tickets may be associated with a same event identifier or a different unique event identifier. In at least one embodiment, a single electronic ticket may be used concurrently by a predetermined number of user devices. For example, a user may desire to purchase access for six devices. Each of the six devices may access the digital event via the same event identifier. When a seventh device attempts to access the digital event via the event identifier, various responses may be triggered, such as a handoff to the seventh device or prohibition of the seventh device from accessing the digital event.

Modifications, additions, or omissions may be made to FIG. 1 without departing from the scope of the present disclosure. For example, the operating environment 100 may include more or fewer elements than those illustrated and described in the present disclosure. For example, the operating environment 100 may include any number of client devices or servers.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the user input device 106 and the display device 118 may be a single device. In another example, one or more of the venue information database 110 or the user data database 115 may be included with the system server 140.

In situations in which the systems discussed here collect personal information about users, or may make use of personal information, the users may be provided with an opportunity to control whether the system server, client device or any database collects user information (e.g., information about a user's social network, social actions or activities, profession, a user's preferences, purchases, or a user's current location), or to control whether and/or how to receive content from the system server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system server, client device or any database.

Figure 2:
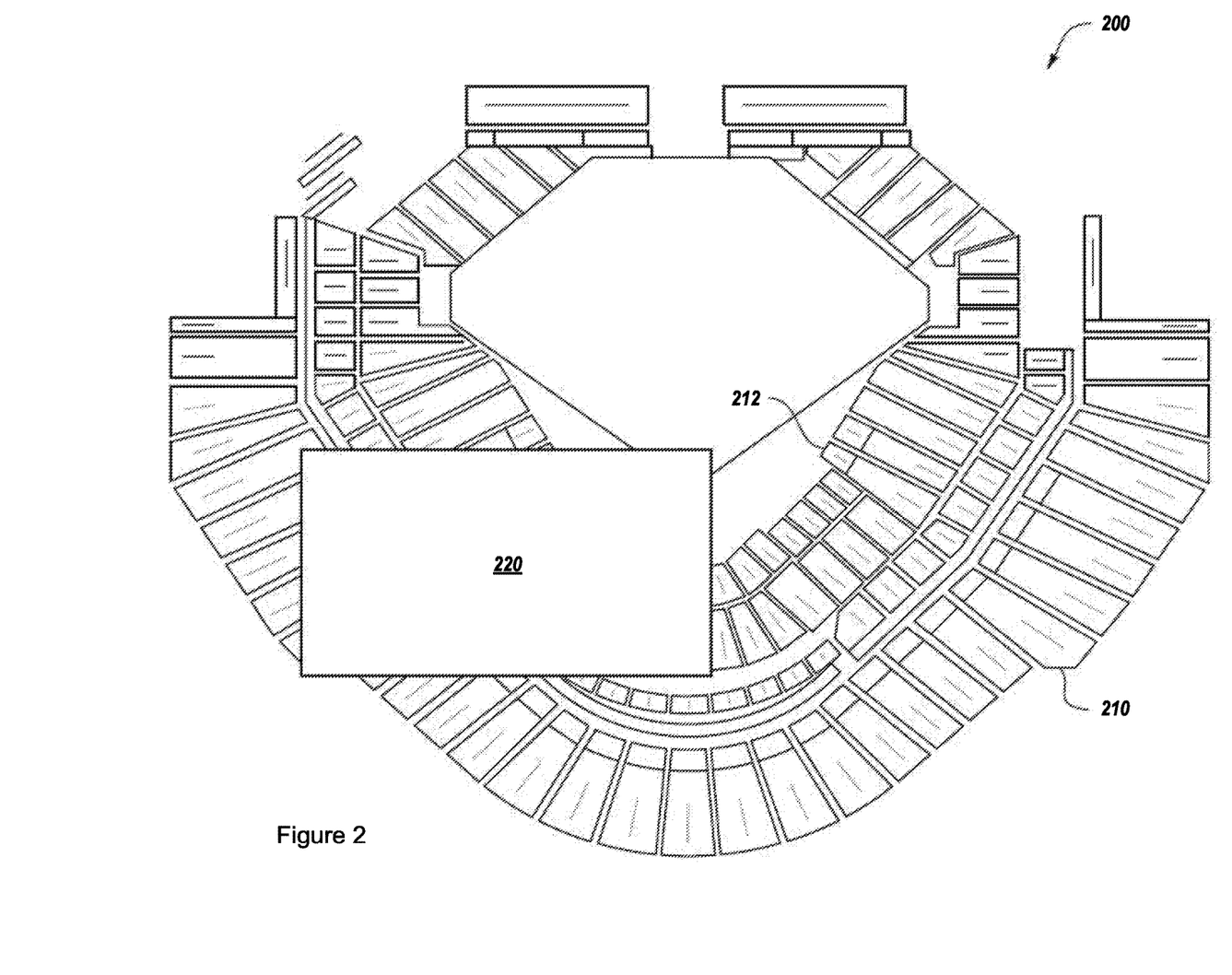
FIG. 2 illustrates an example of an interactive visual element.

FIG. 2 illustrates an example of an interactive visual element 200, in accordance with one or more embodiments of the present disclosure. The interactive visual element 200 may include a venue map 210 with one more sections (e.g., section 212) depicting a venue with listings of seats for purchase. The interactive visual element 200 may additionally include a window 220 for displaying listings.

The interactive visual element 200 may be configured such that a user viewing the interactive visual element 200 may interact with a user interface to select one or more features of the interactive visual element 200. Interacting with the user interface may allow the user to perform a query, refine a query, examine a listing, etc. For example, if a user were to click on the section 212 of the venue map 210, the window 220 may display a textual description of listings in that section. Window 220 may also display an image or video, such as a digital image or video depicting a view from the section or from a particular seat. The window 220 may also display a preview that includes weather data and the digital image or video.

In some embodiments, the window 220 may be sized and/or positioned to overlay portions of the venue map 210, for example. In these and other embodiments, the window 220 may be sized and/or positioned based on the display properties of the display of the device used by the user. For displays with lower resolution and/or smaller display areas, the window 220 may overlay a larger portion of the venue map 210. For displays with high resolution and/or larger display areas, the window 220 may overlay a smaller portion of the venue map 210. In at least one embodiment, a full screen mode may be entered and the window 220 may be displayed in substantially all of the display area.

By selecting a section of the venue map 210, in some embodiments the interactive visual element 200 may display the venue map 210 replaced with a map of the selected section. For example, the interactive visual element 200 may include a map of a section rather than the entire venue map 210 as illustrated in FIG. 2. In these and other embodiments, the window 220 may overlay a portion of the map of the section.

Modifications, additions, or omissions may be made to FIG. 2 without departing from the scope of the present disclosure. For example, the interactive visual element 200 may include more or fewer elements than those illustrated and described in the present disclosure. For example, the interactive visual element 200 may include additional features, links, or aspects of interacting with the interactive visual element 200 not illustrated.

Figure 3:
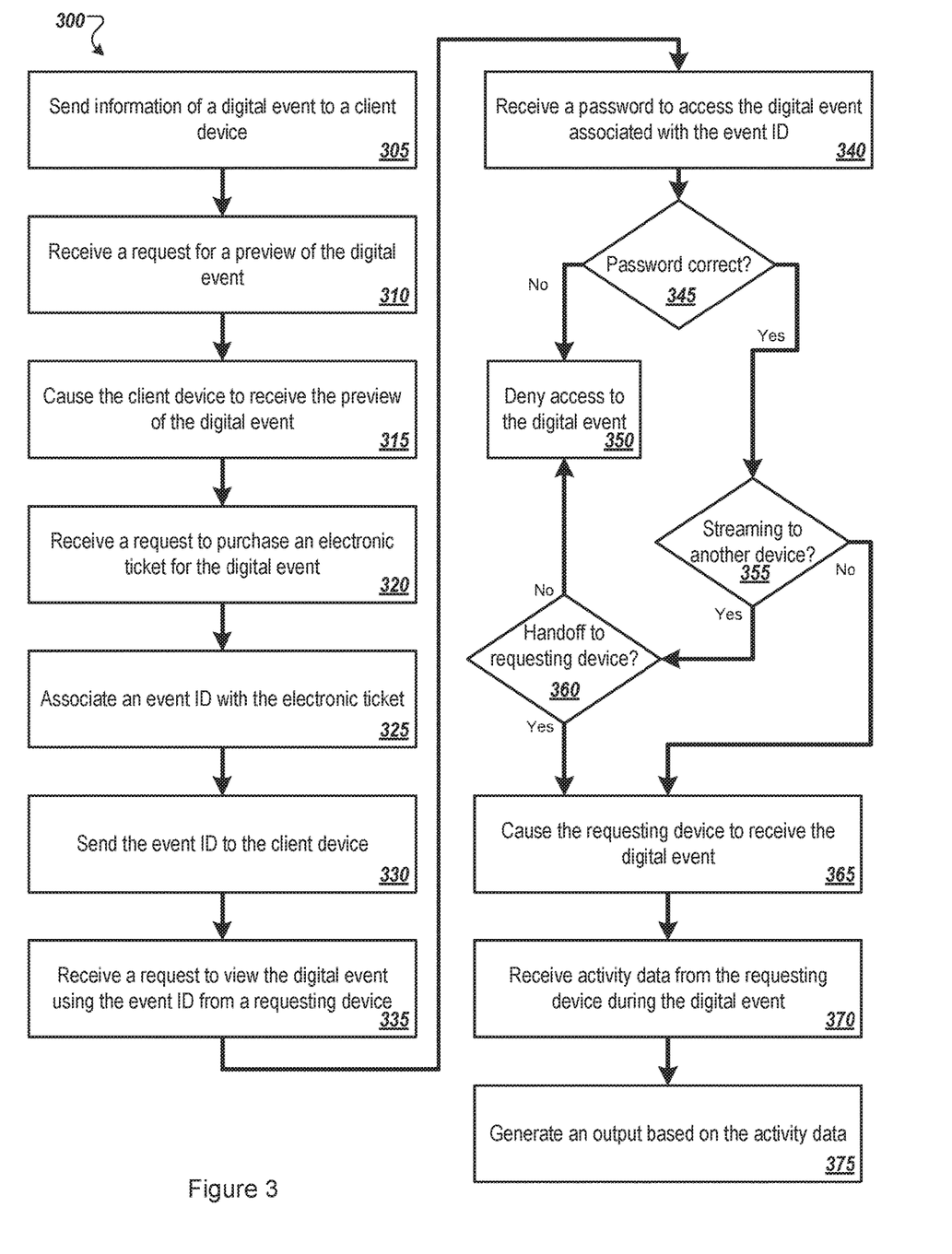
FIG. 3 illustrates a flowchart of an example computer-implemented method for digital event access control.

FIG. 3 illustrates a flowchart of an example computer-implemented method 300 for digital event access control. The method 300 may be performed by any suitable system, apparatus, or device. For example, the system server 140 of FIG. 1 may perform one or more of the operations associated with the method 300. The method 300 may be performed by processing logic that may include hardware (circuitry, dedicated logic, etc.), software (such as is run on a general purpose computer system or a dedicated machine), or a combination of both. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Turning to FIG. 3, at block 305, processing logic may send digital event information to a client device (e.g., the client device 102 of FIG. 1). The processing logic may send the digital event information to the client device in response to receiving a request for the digital event information from the client device. For example, a user may be browsing digital events on the client device and may provide a request for more information pertaining to a specific digital event. The digital event information may include a digital map of the venue (e.g., the interactive visual element 200 of FIG. 2) that may depict multiple seating sections and individual seats in the venue. The digital event information may include a time element (e.g., a date, an exact time, an approximate time, a time of day, such as morning, afternoon, evening). For example, the digital event information may include one or more teams competing at the event, a start time, and end time (or approximate end time), among others. The digital event information may also include pricing information and/or type information (e.g., physical event, virtual event, digital event, audio-only event). At block 310, the processing logic may receive a request for a preview of the digital event. The preview may include an image, a video, etc., as described herein.

At block 315, the processing logic may cause the client device to receive the preview of the digital event. In at least one embodiment, the processing logic may send the preview to the client device. In at least one embodiment, the processing logic may combine the preview with weather data, such as by overlaying (and/or flattening) the weather data on a digital image or video. In at least one embodiment, the processing logic may create instructions for how to present the weather data and the digital image. The processing logic may generate instructions to instruct the client device to generate an interactive visual element depicting the preview and the weather data via a user interface. For example, the instructions may include one or more times and associated positions in which to present the weather data over the preview. The processing logic may send these instructions to the client device with the preview and the weather data. In at least one embodiment, the processing logic may instruct a different server (e.g., a preview management server) to send the preview to the client device via a network.

At block 320, the processing logic may receive a request to purchase an electronic ticket to the digital event. Using the electronic ticket, the user (by way of a client device) may access the digital event. The purchase request may include payment details. In at least one embodiment, the user may also specify to the processing device one or more devices that may be authorized to access the digital event, which may be referred to as "authorized devices." In at least one embodiment, the processing logic may present purchase information via the display device. The purchase information may include details on how to purchase the electronic ticket, such as a price at which the electronic ticket may be sold, discounts, or sales, etc. The purchase information may also include a link to a purchase page where the user may initiate a purchase of the item. In at least one embodiment, the purchase information may include a purchase tool that permits a user to purchase the electronic ticket. The purchase request may be forwarded to an information system that handles transactions and processed at the information system. A confirmation message may be sent to the processing logic and the processing logic may send the confirmation message to the client device.

At block 325, the processing logic may associate an event identifier with the electronic ticket. In at least one embodiment, the processing logic may generate the event identifier, which may be any string of characters. In some embodiments, the event identifier may include a URL or an access code to enter into a field at a later time.

At block 330, the processing logic may send the event identifier to the client device. The processing logic may also send a purchase confirmation that may include the event identifier. Alternatively, the purchase confirmation and the event identifier may be sent separately to the client device. In at least one embodiment, before or after the purchase is complete, the processing logic may associate a password with the event identifier. In at least one embodiment, the processing logic may request a password from the client device. In another embodiment, the processing logic may also inherit a password, such as a password used by the user to access a user account associated with an online marketplace system. In a further embodiment, the processing logic may generate a password for the digital event. The generated password may be unique to the user, to the client device, or to the digital event. The processing logic may send the generated password to the client device either with the event identifier or under separate cover as the event identifier.

At block 335, the processing logic may receive a request to view the digital event using the event identifier. The processing logic may receive the request from the same client device that was used to purchase the electronic ticket or may receive the request from another device. The client device that sends the request to view the digital event to the processing logic may be referred to as the "requesting device." The processing logic may request that the requesting device send a password to access the digital event associated with the event identifier. At block 340, the processing logic may receive a password to access the digital event associated with the event identifier from the requesting device. At block 345, the processing logic may validate the password. When the password is incorrect ("NO" at block 345), at block 350, the processing logic may deny access to the digital event for the requesting device.

When the password is correct ("YES" at block 345), at block 355, the processing logic may determine whether another device (the "streaming device) is currently streaming the digital event. Further to the description below with respect to block 365, the processing logic may identify a streaming device based on a device identifier of a streaming device. For example, when any device accesses the digital event, the processing logic may track such accesses by recording a device identifier of the device. To determine whether another device is currently streaming the digital event, the processing logic may query a record that includes a device identifier of any currently streaming device. In at least one embodiment where the event identifier is a URL, the processing logic may query whether any devices have accessed the URL and/or have an active connection and are streaming the digital event via the URL.

Figure 4:
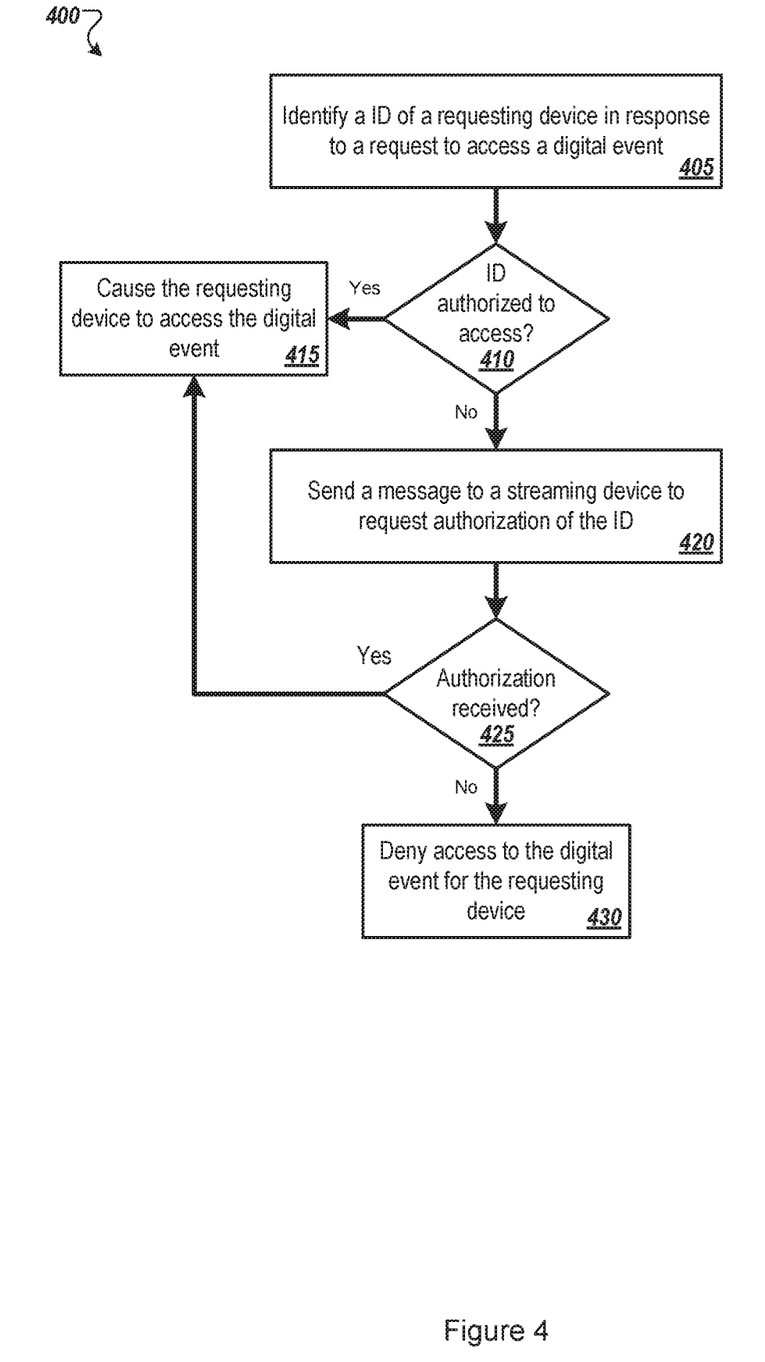
FIG. 4 illustrates a flowchart of an example computer-implemented method to determine whether to handoff a digital media stream to a requesting device.

When another device is currently streaming the digital event ("YES" at block 355), at block 360, the processing logic may determine whether to handoff streaming to the requesting device, as further described in conjunction with FIG. 4.

When another device is not currently streaming the digital event ("NO" at block 355), at block 365, the processing logic may cause the requesting device to receive the digital event. Receiving the digital event may include: providing access to an Internet-based source that hosts the digital event, causing the receiving device to receive a digital media stream of or associated with the digital event, or permitting the receiving device to download at least a portion of the digital event, etc. In response to causing the requesting device to receive the digital event, the processing logic may identify a device identifier of the receiving device and record the device identifier in a data storage. The device identifier may be stored in association with the event identifier, a user identifier (e.g., user profile) or both.

At block 370, the processing logic may receive activity data from the requesting device during the digital event. The activity data may be indicative of user engagement during the digital event. The activity data may include actions of the user during the digital event. For example, the actions may include a laugh during a joke being told as part of the digital event, cheering in response to a grand slam in a baseball game, singing along to the words of a song in a concert, etc. The activity data may also include activity of the receiving device, such as whether the receiving device is turned off, whether the receiving device moves suddenly or sharply (which may indicate user action), etc. The activity data may also include environmental conditions, such as an ambient temperature, humidity, etc.

At block 375, the processing logic may generate an output based on the activity data received from the requesting device during the digital event. The output may include a message, an advertisement, an offer to purchase another electronic ticket, etc. In at least one embodiment, the processing logic may generate a highlight media item that may be provided to the receiving device after the digital event. For example, the highlight media item may include those portions of the digital event during which the user was cheering loudly. The processing logic may also receive input from the receiving device to record segments of the digital event. For example, the user may provide input to the receiving device to record or mark various segments for later inclusion in the highlight media item.

Modifications, additions, or omissions may be made to the method 300 without departing from the scope of the present disclosure. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. For example, the processing logic may interact with a first client device (e.g., the "purchasing device") in some or all of blocks 305, 310, 315, 320, 325 and 330 and may interact with a second client device (e.g., the requesting device) in some or all of blocks 335, 340, 345, 350, 355, 360, 365, 370 and 375.

FIG. 4 illustrates a flowchart of an example computer-implemented method 400 to determine whether to handoff a digital media stream to a requesting device. The method 400 may be performed by any suitable system, apparatus, or device. For example, the system server 140 of FIG. 1 may perform one or more of the operations associated with the method 400. The method 400 may be performed by processing logic that may include hardware (circuitry, dedicated logic, etc.), software (such as is run on a general purpose computer system or a dedicated machine), or a combination of both. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 405, the processing logic may identify a device identifier of a requesting device in response to receiving a request to access a digital event. The device identifier may include a Unique Device Identifier (UDID), Universally Unique Identifier (UUID), media access control address (MAC address), etc. The request to access the digital event may include a "pull" request or a "push" request. A pull request may refer to a request by a device that is to access the digital event itself. A push request may refer to a request by a device on behalf of another device, where the other device is to access the digital event.

At block 410, the processing logic may determine whether the device identifier is authorized to access the digital event. The processing logic may query a white list, a black list, a user profile, etc. to determine whether the device identifier is authorized to access the digital event. For example, when the device identifier is on a white list, the device identifier may be authorized. When the device identifier is on a black list, the device identifier may be prohibited. In another example, a user may preauthorize a device to access the digital event. The user may add the device identifier to a user profile, for example. The processing logic may query to the user profile to determine whether the device identifier is authorized.

When the device identifier is authorized to access the digital event ("YES" at block 410), at block 415, the processing logic may cause the requesting device to receive the digital event as further described with respect to block 365 of FIG. 3.

When the device identifier is not authorized to access the digital event ("NO" at block 410), at block 420, the processing logic may send a message to a streaming device to request authorization of the device identifier of the requesting device. As further described with respect to block 355 of FIG. 3, another device (the streaming device) may currently be streaming the digital event. The processing logic may send the message to the streaming device to determine whether to initiate a handoff from the streaming device to the requesting device. The streaming device may present, via a user interface, the message to a user and request input from the user. The user input may include authorization input to allow the receiving device to access the digital event or prohibition input to prohibit the receiving device from accessing the digital event. The streaming device may send the user input to the processing logic.

At block 425, the processing logic may receive the user input and determine whether the user input includes an authorization to allow the receiving device to access the digital event.

When the user input includes an authorization to allow the receiving device to access the digital event ("YES" at block 425), at block 415, the processing logic may cause the requesting device to receive the digital event as further described with respect to block 365 of FIG. 3. Cause the requesting device to receive the digital event may include facilitating a handoff a digital event stream, where the streaming device no longer is currently streaming the digital event and where the receiving device is now currently streaming the digital event. In at least one embodiment, the processing logic may receive an authorization to permit the requesting device and the streaming device to simultaneously access the digital event. For example, either the requesting device or the streaming device may purchase the simultaneous access for an additional fee, which may be any amount, including less than a price for access to the digital event by a single device.

When the user input does not include an authorization to allow the receiving device to access the digital event, or when the processing logic does not receive express authorization within a threshold amount of time ("NO" at block 425), at block 430, the processing logic may deny access to the digital event for the requesting device, as further described with respect to block 350 of FIG. 3.

Modifications, additions, or omissions may be made to the method 400 without departing from the scope of the present disclosure. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
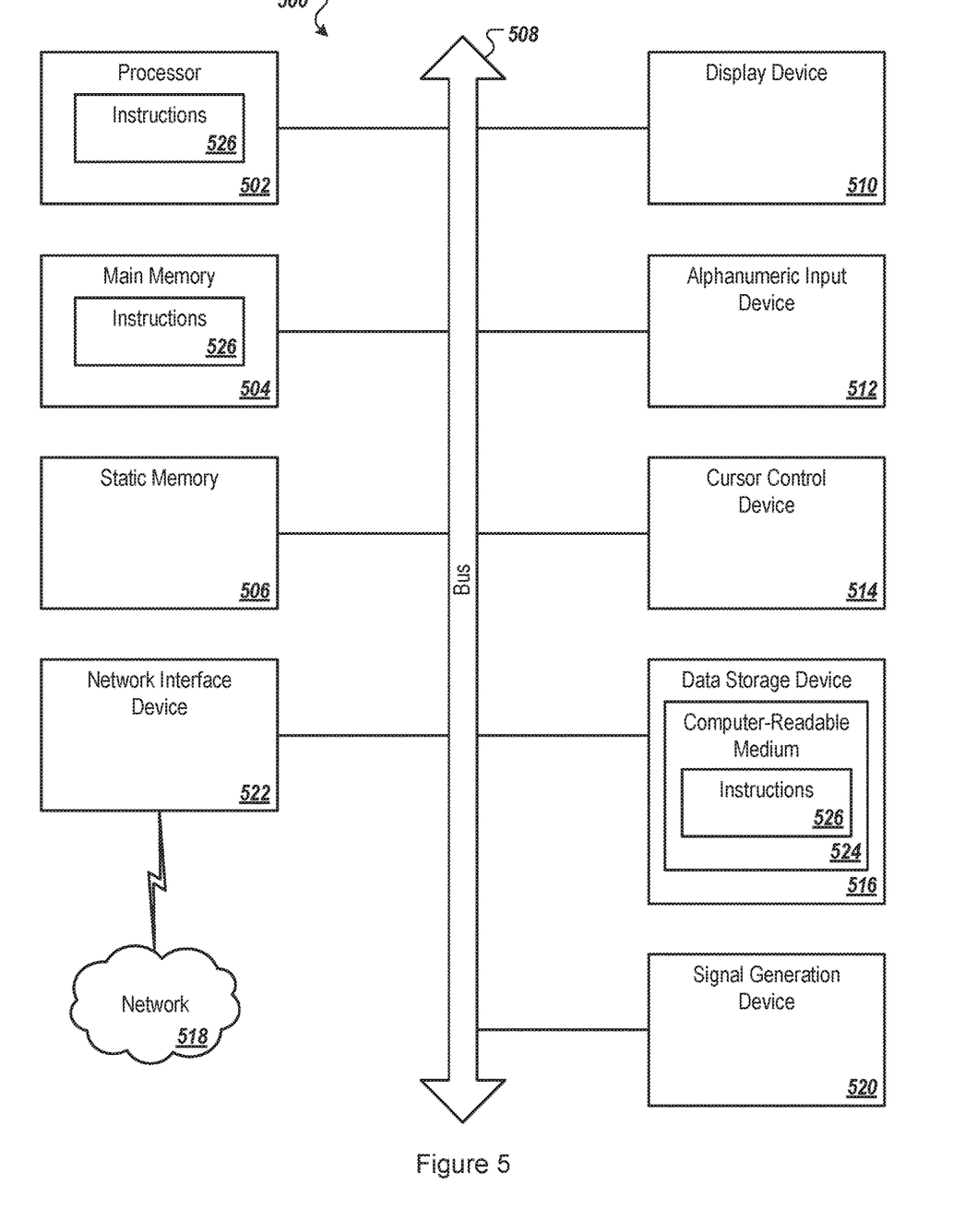
FIG. 5 illustrates a diagrammatic representation of a machine in the example form of a computing device within which a set of instructions, for causing the machine to perform any one or more of the methods discussed herein, may be executed, each in accordance with one or more embodiments of the present disclosure.

FIG. 5 illustrates a diagrammatic representation of a machine in the example form of a computing device 500 within which a set of instructions, for causing the machine to perform any one or more of the methods discussed herein, may be executed. The computing device 500 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed in the present disclosure.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In one implementation, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used in the present disclosure and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of the following: A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A method, comprising:
receiving, from a first client device, a request to purchase an electronic ticket for a digital event, wherein the digital event comprises a digital representation of a tangible event or an intangible event held at a physical or virtual venue for which electronic tickets are required for access;
in response to receiving the request to purchase, associating an event identifier with the electronic ticket, the event identifier comprising a unique string including a uniform resource locator associated with the request to purchase from the first client device;
sending the event identifier to the first client device;
receiving an access request to access the digital event, wherein the access request includes the event identifier and a password;
in response to a determination that the password corresponds to the event identifier, identifying a second client device that is currently accessing the digital event, wherein the second client device was previously authorized to access the digital event based on the password and the event identifier;
sending a message to the second client device indicative of the access request received from the first client device;
receiving authorization from the second client device to initiate a transfer of access to the digital event from the second client device to the first client device; and
in response to receiving authorization for the second client device to access the digital event from the first client device, causing the first client device to receive a digital media stream associated with the digital event and causing the second client device to stop receiving the digital media stream associated with the digital event.

2. The method of claim 1 further comprising:
receiving a preview request for a digital preview of the digital event from the first client device, wherein the digital preview includes an image or a video; and
causing the first client device to receive the digital preview of the digital event.

3. The method of claim 1, wherein the password is a user-selected password, the method further comprising receiving the user-selected password.

4. The method of claim 1, wherein identifying the second client device that is currently accessing the digital event comprises identifying an active connection to a digital media file associated with the digital event.

5. The method of claim 2, wherein the digital preview depicts a seat view from a particular location of the physical or virtual venue.

6. The method of claim 1 further comprising:
receiving activity data from the first client device, the activity data being indicative of user engagement in the digital event; and
generating an output for the first client device based on the activity data.

7. A non-transitory computer-readable medium including instructions that, when executed by a processor, are configured to control operations, the operations comprising:
receiving a request to purchase an electronic ticket for a digital event, wherein the digital event comprises a digital representation of a tangible event or an intangible event held at a physical or virtual venue for which electronic tickets are required for access;
in response to receiving the request to purchase, associating an event identifier with the electronic ticket, the event identifier comprising a unique string including a uniform resource locator associated with the request to purchase from a first client device;
sending the event identifier to the first client device;

receiving, from the first client device, a first request to access the digital event, wherein the first request includes the event identifier and a password;

in response to a determination that the password corresponds to the event identifier, causing the first client device to receive a digital media stream associated with the digital event;

receiving a second request to access the digital event from a second client device, wherein the second request includes the event identifier and the password;

sending a message to the first client device to authorize the second client device to view the digital event; and in response to receiving authorization for the second client device to access the digital event from the first client device, causing the second client device to receive the digital media stream associated with the digital event and causing the first client device to stop receiving the digital media stream associated with the digital event.

8. The non-transitory computer-readable medium of claim 7, the operations further comprising:

receiving a preview request for a digital preview of the digital event from the first client device, wherein the digital preview includes an image or a video; and causing the first client device to receive the digital preview of the digital event.

9. The non-transitory computer-readable medium of claim 7, the operations further comprising determining that the first client device has an active connection to the digital media stream associated with the digital event.

10. The non-transitory computer-readable medium of claim 7, the operations further comprising:

receiving activity data from the first client device, the activity data being indicative of user engagement in the digital event; and generating an output for the first client device based on the activity data.

11. The non-transitory computer-readable medium of claim 8, wherein the digital preview depicts a seat view from a particular location of the physical or virtual venue.

12. The non-transitory computer-readable medium of claim 7, wherein the password is a user-selected password, the operations further comprising receiving the user-selected password.

13. A system, comprising:

a memory, and a processor operatively coupled to the memory, the processor being capable to execute computer-readable instructions that, when executed by the processor, cause the processor to:

receive a purchase request to purchase an electronic ticket for a digital event, wherein the digital event comprises a digital representation of a tangible event or an intangible event held at a physical or virtual venue for which electronic tickets are required for access;

in response to receiving the purchase request, associate an event identifier with the electronic ticket, the event identifier comprising a unique string including a uniform resource locator associated with the purchase request from a first client device;

send the event identifier to the first client device;

receive, from the first client device, a first request to view the digital event, wherein the first request includes the event identifier and a password;

in response to a determination that the password corresponds to the event identifier, cause the first client device to receive a digital media file associated with the digital event;

receive a second request to access the digital event from a second client device, wherein the second request includes the event identifier and the password;

identify a device identifier of the second client device;

cause the second client device to access the digital event when the device identifier is included in a white list and cause the first client device to stop receiving the digital media file associated with the digital event; and send a message to the first client device indicative of the second request received from the second client device and that indicates that the second client device is authorized to access the digital event.

14. The system of claim 13, the computer-readable instructions further causing the processor to receive authorization from the first client device to initiate a transfer of access to the digital event from the first client device to the second client device.

15. The system of claim 13, the computer-readable instructions further causing the processor to deny access of the second client device to the digital event when the device identifier is included in a black list.

16. The system of claim 13, wherein the purchase request to purchase the electronic ticket for the digital event is received from a third client device.

17. The system of claim 13, the computer-readable instructions further causing the processor to:

receive a request for a digital preview of the digital event from the first client device, wherein the digital preview includes an image or a video; and send the digital preview of the digital event to the first client device.

18. The system of claim 13, the computer-readable instructions further causing the processor to:

receive activity data from the first client device, the activity data being indicative of user engagement in the digital event; and generate an output for the first client device based on the activity data.

19. The system of claim 13, wherein the password is a user-selected password, the computer-readable instructions further causing the processor to receive the user-selected password.

20. The system of claim 17, wherein the digital preview depicts a seat view from a particular location of the physical or virtual venue.

* * * * *